Oct. 10, 1950   J. McMULLEN   2,525,613

JOURNAL BEARING STRUCTURE

Filed Dec. 2, 1947

INVENTOR.
JOHN McMULLEN
BY
Samuel Reese
ATTORNEY

Patented Oct. 10, 1950

2,525,613

UNITED STATES PATENT OFFICE 2,525,613

JOURNAL BEARING STRUCTURE

John McMullen, Buffalo, N. Y.

Application December 2, 1947, Serial No. 789,155

4 Claims. (Cl. 308—53)

This invention relates to bearing structure and more particularly to bearing structures for the journals of railway rolling stock.

A constant source of delay in shipment and expense to the railroads is the "hot box" which develops in railway rolling stock when the wheel journals are inadequately lubricated. Inadequate lubrication has been attributed to various causes but I have discovered that a prolific source of this evil lies in the crushing or spreading of the linings of the bearings when the journals are displaced in the journal boxes. Such displacement takes place when the railway cars are subjected to heavy impact or when emergency brake applications occur. Crushing of the bearing linings brings about such intimate contact between them and the journals that the lubricating oil in the journal box is wiped off the journals by the lining before the oil can reach and effectively lubricate the contacting surfaces of the journal and lining. Under this condition the development of "hot boxes" occurs. The need for replacement of the bearing structures arises also when the impact to the cars referred to above causes spreading of the bearing lining beyond the edges of the lining backing member.

I have discovered, furthermore, what I believe to be the essential cause of the crushing or spreading of bearing linings. It lies primarily in the present design of the bearings and bearing wedges. The lower portions of the sides of the bearings are relatively thin. These thin side portions carry lugs which cooperate with pads carried by the sides of the journal boxes. Upon displacement of the journals as noted above, the relatively thin side portions of the bearings adjacent to the lugs are jammed against the pads resulting in an inward crushing of the bearings including the bearing linings or a spreading of the bearing linings.

It is accordingly the main object of this invention to provide bearing structures for the journals of railway rolling stock which shall embody bearings and bearing wedges so constructed as to obviate the crushing or spreading of the bearing linings upon displacement of the journals without modification or change of the journals or journal boxes.

A further object is to provide journal bearing structures which shall embody bearings and bearing wedges whose contacting surfaces extend flatwise substantially between the journal box pads.

A further object is to provide journal bearing structures which shall embody bearings and bearing wedges so constructed and arranged as to successfully resist impact resulting from the displacement of the journals and form a sturdy base for the pad-engaging lugs.

A further object is to provide journal bearing structures of the character immediately above described wherein the lower portion of the bearings shall be so constructed that they cannot come into contact with the journal box pads when the journals are displaced.

A further object is to provide packing retainers of simple and economical construction capable of utilizing the structure of the bearings and bearing wedges as positioning and retaining means.

Other objects of the invention will become clear as the description thereof proceeds.

In the drawings forming part of this specification:

Figure 1:
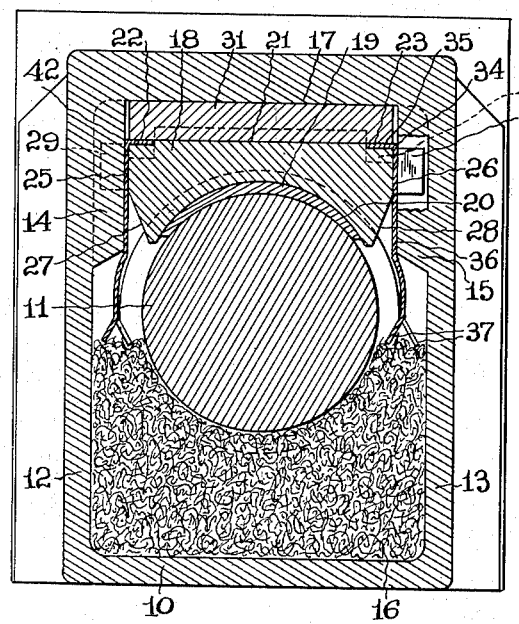
Fig. 1 is a vertical section through a journal box illustrating the instant invention.

In the drawings, which illustrate a preferred embodiment of my invention, the reference numeral 10 designates a journal box of a railway car in which a wheel axle journal 11 is housed. The journal box is of conventional construction and need not be described specifically. For a more detailed showing, however, of a journal box reference is made to the Manual of The American Association of Railroads. For the purpose of my invention it is pointed out that the side walls 12 and 13 of journal boxes are formed with opposed pads 14 and 15 which are usually cast integral therewith. The journal box carries oil-saturated packing material 16 which supplies lubricating oil to the journal. Upon rotation the journal carries the oil upwardly between the journal and the bearing structure 17 of my invention disposed upon the journal.

The illustrated embodiment of my invention has a backing member 18 customarily made of brass and forming a carrier for a curved lining 19 of bearing material secured to the lower curved surface 20 of the backing member and contacting the journal. The upper surface 21 of the backing member is substantially flat, and is recessed as indicated at 22 and 23 for a purpose which will appear hereinafter. As appears from Fig. 1 of the drawings the width of this surface is substantially equal to the distance between the pads 14 and 15. The customary transversely extending lug 24 extends upwardly from this surface and its rear margin.

The sides of the backing member may be considered to have two portions. The upper portions 25 and 26 of the sides are substantially parallel and are spaced apart a distance substantially equal to the distance between the pads. The lower portions 27 and 28 of the sides are offset inwardly, as by being inclined as shown, so as to lie in downwardly divergent relationship with respect to the pads.

Figure 2:
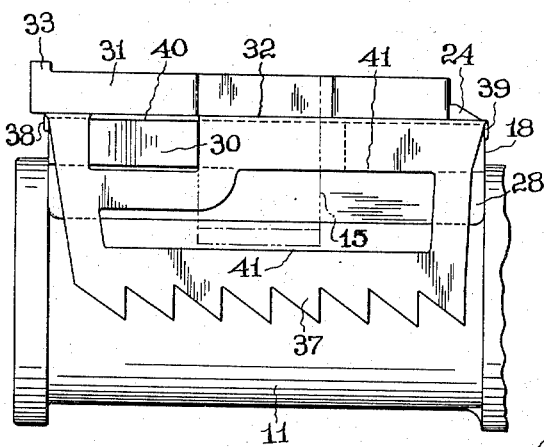
Fig. 2 is a side elevation of the structure embodying the instant invention in its relationship to a journal.
Figure 5:
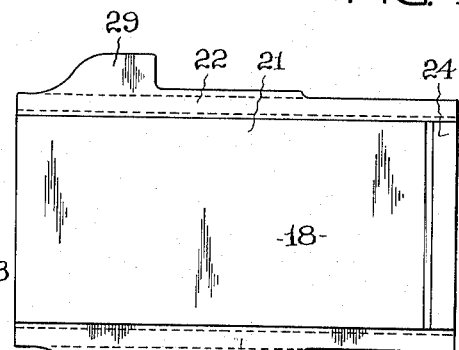
Fig. 5 is a plan view of a bearing member.
Figure 6:
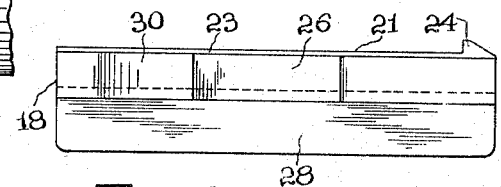
Fig. 6 is a side elevation of the member shown in Fig. 5.

Lugs 29 and 30 extend outwardly from the upper sturdy portions 25 and 26 of the sides of the backing member and are disposed, as illustrated in Figs. 1 and 2, to engage the pads 14 and 15 to limit rearward movement of the backing member on the journal.

Figure 3:
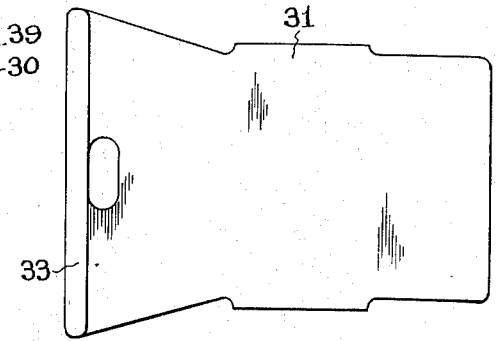
Fig. 3 is a plan view of a wedge member.
Figure 4:
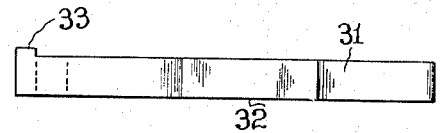
Fig. 4 is a side elevation of the member shown in Fig. 3.

Seated upon the upper surface of the backing member is a wedge 31 which lies between the backing member and the top of the journal box. As is clearly shown in Figs. 1, 3 and 4, the wedge has a substantially flat under surface 32 so that it has substantially flatwise engagement with the upper surface of the backing member. In cross section the wedge is substantially rectangular and the portion thereof which lies between and adjacent to the pads 14 and 15 is of a width substantially equal to the ditsance between the pads. A transversely extending lug 33 rises from the upper surface of the wedge along the forward margin thereof, and engages lugs (not shown) on the journal box to prevent forward movement of the wedge on the backing member.

I utilize the bearing structure of my invention to support and retain a packing retainer in the journal box. In the particular embodiment illustrated my retainer is formed in two sections, although it will be understood that, if desired, these sections may be secured together by straps or the like into a single member. Section 34 of the retainer, which is preferably formed of sheet metal, embodies a horizontal flange 35 which is seated in the recess 22 of the upper surface 21 of the backing member 18 so as to lie flush with said surface. This section also embodies a vertical flange 36 which extends downwardly and engages the packing material 16. In order to prevent horizontal movement of the packing material in the journal box and upward movement of the packing material by reason of the rotation of the journal the lower edge of the flange 36 is serrated to form teeth 37, alternate ones of which are displaced as shown in Fig. 1 to increase the area of engagement with the packing material.

The ends of the horizontal flange 35 of the retainer are bent downwardly to form flanges 38 and 39 which are adapted to abut the edges of the backing member. The latter flanges together with the seating of the wedge upon the horizontal flange 35 serve to prevent forward, rearward and upward movement of the retainer section 34 so that it is securely retained in its proper position.

Vertical flange 36 is formed with an opening 40 through which lug 29 projects. The retainer, consequently, does not interfere with the described function of the lug, and, at the same time, utilizes the lug as a positioning and retaining means. An opening 41 formed in the vertical flange serves to reduce the weight of the retainer.

Section 42 of the retainer is substantially of the same construction as section 34 hereinabove described and the description of the latter will suffice for the former section.

It will be apparent from the foregoing description that by virtue of my invention extremely sturdy sections of the backing member and wedge member are provided to resist stresses imposed upon them when journals are displaced under impact to the cars. This section of the backing member, moreover, affords a solid, sturdy base for the lugs extending from the sides thereof. Of importance also is the design of the lower portions of the backing member which precludes the incidence of crushing stresses thereupon. The resulting elimination of "hot boxes" from the noted source will afford substantial savings to the railroads and remove a serious cause of delay in shipments. My invention, furthermore, utilizes the bearing structure to mount and retain an effective and economical packing retainer in the journal box, thereby preventing the development of "hot boxes" resulting from waste grab.

It will be apparent that numerous changes and modifications in the details of the invention will be clear to those skilled in the art. It is intended, therefore, that all such modifications and changes be comprehended within this invention, which is to be limited only by the scope of the claims appended hereto.

I claim:

1. A bearing structure for railway car journals housed in journal boxes having side walls formed with inner opposed pads, said structure comprising a backing member having a substantially flat upper surface of a width substantially equal to the distance between said pads, sides having upper portions spaced apart a distance substantially equal to the distance between said pads and inwardly offset lower portions and a curved lower surface, a curved lining member secured to said curved surface, lugs extending outwardly from said upper portions of said sides and engageable with said pads, said structure also comprising a wedge member substantially rectangular in cross section and of a width substantially equal to the distance between said pads, said wedge member being seated substantially flatwise upon the upper surface of said backing member.

2. A structure as described in claim 1 in which the inwardly offset lower portions of the sides of the backing member are inclined.

3. A backing member for use in a bearing structure for railway car journals adapted to be housed in journal boxes having opposed pads extending inwardly from the side walls thereof, said member comprising a substantially flat upper surface of a width substantially equal to the distance between said pads, sides having upper portions spaced apart a distance substantially equal to the distance between said pads and inwardly offset lower portions, and lugs extending outwardly from said upper portions of said sides, said lugs being adapted to engage said pads to limit movement of said backing member along a journal.

4. A structure as described in claim 3 in which the inwardly offset lower portions of the sides of the backing member are inclined.

JOHN McMULLEN.

REFERENCES CITED

The following references are of record in the file of this patent:

UNITED STATES PATENTS

| Number | Name | Date |
| --- | --- | --- |
| 701,065 | Magee | May 27, 1902 |
| 1,917,510 | Dibble | May 6, 1912 |
| 1,877,638 | Baldwin | Sept. 13, 1932 |
| 1,976,537 | Bary | Oct. 9, 1934 |
| 2,214,727 | Gewin | Sept. 17, 1940 |
| 2,276,379 | Engleman | Mar. 17, 1942 |

FOREIGN PATENTS

| Number | Country | Date |
| --- | --- | --- |
| 438,040 | France | May 6, 1912 |
| 10,957 | Great Britain | May 4, 1914 |
| 28,996 | Australia | Sept. 15, 1930 |